United States Patent [19]

Bold

[11] Patent Number: 5,520,779
[45] Date of Patent: May 28, 1996

[54] PROCESS AND APPARATUS FOR PRODUCING FIBER-REINFORCED PLASTER PLATES

[75] Inventor: Jörg Bold, Kaiserslautern, Germany

[73] Assignee: Babcock BSH Aktiengesellschaft vormals Buttner-Schilde-Haas AG, Krefeld, Germany

[21] Appl. No.: 196,239

[22] PCT Filed: Aug. 20, 1992

[86] PCT No.: PCT/EP92/01898

§ 371 Date: Feb. 18, 1994

§ 102(e) Date: Feb. 18, 1994

[87] PCT Pub. No.: WO93/04008

PCT Pub. Date: Mar. 4, 1993

[30] Foreign Application Priority Data

Aug. 23, 1991 [DE] Germany .......................... 41 27 929.8
Aug. 23, 1991 [DE] Germany .......................... 41 27 930.1
Aug. 23, 1991 [DE] Germany .......................... 41 27 932.8

[51] Int. Cl.⁶ .................... D21H 17/66; D21H 17/63; B28B 1/52; C04B 28/14

[52] U.S. Cl. ............... 162/181.3; 162/158; 162/181.2; 162/133; 106/772; 106/653; 156/39; 156/41; 156/42

[58] Field of Search ................... 162/133, 158, 162/181.2, 181.3; 106/772, 653, 685; 156/39, 41, 42

[56] References Cited

U.S. PATENT DOCUMENTS 3,737,265  6/1973  Schafer et al. .................. 425/140
3,951,735  4/1976  Kondo .............................. 106/653
4,502,901  3/1985  Burkard ............................. 156/39
4,734,163  3/1988  Eberhardt et al. ............... 162/181.3
4,942,003  7/1990  Bold .................................. 264/40.4
5,015,449  5/1991  Koslowski ........................ 423/172
5,154,874  10/1992 Koslowski ........................ 264/333
5,171,366  12/1992 Richards et al. ................. 106/772

FOREIGN PATENT DOCUMENTS

4127929A1   2/1993  Germany .
654582      6/1951  United Kingdom .
656846      9/1951  United Kingdom .
1378695    12/1974  United Kingdom .

OTHER PUBLICATIONS

A New Method for Producing Gypsum Fiberboard at a Dutch Gypsum Plant by J. Bold, published by 264 Zement-Kalk-Gips (ZKG), 42 (1989) May.

Primary Examiner—David L. Lacey
Assistant Examiner—Jose A. Fortuna
Attorney, Agent, or Firm—Herbert Dubno

[57] ABSTRACT

Process and apparatus for the continuous production of gypsum fiber plates in which the fiber component is dewatered and rediluted with water recovered from the gypsum-fiber suspension after it has been spread on a belt, passed over at least two suction boxes and densified on the last suction box by a densifying device engaging the filter cake layer from the top.

33 Claims, 6 Drawing Sheets

PROCESS AND APPARATUS FOR PRODUCING FIBER-REINFORCED PLASTER PLATES

CROSS REFERENCE TO RELATED APPLICATIONS

This application is a national phase of PCT/EP92/01895 filed 20 Aug. 1992 and based, in turn, upon German national applications P 41 27 929.8, P 41 27 930.1 and P 41 27 932.8 of 23 Aug. 1991 under the International Convention.

FIELD OF THE INVENTION

My present invention relates to a process and apparatus for producing files reinforced plaster plates and plasterboard.

BACKGROUND OF THE INVENTION

Various products are generically defined as gypsum-fiber plates or plasterboard (GF-plates), depending on the process by which they have been produced. What they have in common is only the fact that the reinforcement is done by fibers embedded in the gypsum, while in the gypsum-cardboard plates (GK-plates) or plasterboard a cardboard on the surface is the reinforcement element.

The processes for producing fiber-reinforced plaster plates can be categorized as follows:

1) Dry or Semi-dry Processes

These owe their name to the fact that for the formation of the plate a spreadable mix is used, which can be either completely dry, as in German Patent Document 21 03 931 or prewetted in a controlled manner, as described in European Patent Document EP 0 153 588.

The advantages of the dry process are the following:

The technique used is derived from chipboard manufacturing and is therefore a proven technology.

Chipboard technology has shown that a high degree of overall efficiency can be achieved. This is considered essential of the GF-Plate to compete with the GK-plate.

The residual water content to be dried in the plate is comparatively low in comparison with the wet process, which saves on energy costs.

Problems with gypsum-containing water are avoided.

The disadvantages of the dry process are the following:

Dry paper treatment is unsatisfactory. It consumes large amounts of electrical and mechanical energy and in the end delivers a product which is not well suited for reinforcement. As a result the plates have less strength than they should have for a given density and composition.

For the mixing and wetting of a dry GF-mixture no reliable solution has yet been found.

The machinery for the dry process is considerably more complicated and expensive than that required for the wet process, because heavy presses are necessary.

2) Wet Processes

In these processes the plate is formed from a watery suspension of gypsum and fibers and that the excess water is mechanically removed. In this procedure several specific problems arise, the greatest being the poor dewatering capability of the gypsum-fiber suspension, which limits high production output. This is the reason why wet processes have been uneconomical up to now, in spite of the low investment costs.

However wet processes also have very definite advantages.

The paper fiber can be treated much gently and finely in water, so that the amount of fiber required for reinforcement is clearly smaller than with the dry paper process.

There is no known dry mixing process which mixes the fiber and the gypsum as evenly as the mixture in suspension.

The wet fiber stretches and orients itself in the plate plane during dewatering.

As a result of these three facts, the GF-plates produced by the wet process have a clearly higher strength and can be lighter for the same strength than the GK-plates produced by the dry paper method.

The wet paper treatment is a perfectly controlled technology, by contract with the dry paper method.

The wet paper treatment consumes much less electric energy than the dry paper method. This more than compensates for the drawback of higher thermal energy consumption during the drying of the plate.

Wet processes do not require heavy-duty presses, which count for a large part of the investment costs in the dry paper processes. The specific investment costs for wet processes are therefore lower in installations with low output.

However with all the undeniable advantages of the wet processes, one cannot ignore some important disadvantages:

The control of large amounts of gypsum-saturated water is not simple.

Because of the cycle the setting has to be delayed, which complicates a continuous process.

The amount of water to be removed in drying is relatively high (up to 80% of the dry plate weight).

In the wet processes, the long-known Hatschek process or related processes, from asbestos cement plates technology, are often used. German Patent DE 1 104 419 describes a process in which a suspension of gypsum and fibers is deposited on a screen or textile felt and then transferred as a fleece to a roller with a large diameter, where it is wound up until the desired plate thickness is reached. Then the layer is separated along the generatrix of the cylinder and the wound-off portion forms a raw plate, which settles between sheet metal plates and is finally dried.

In 1973 Knauf resumed the development (German Patent document DE 23 62 220). It became possible to multiply the output of a Hatschek machine, by using aridized gypsum.

Another process is the so-called endless screen-belt process, which is derived from paper manufacturing. An example is described in German Patent document OS 23 65 161 of the Portland-Zementwerke Heidelberg. Thereby a suspension of gypsum and scrap fibers from cellulose manufacture are formed in a single layer into a plate, left to settle and dried.

Babcock tries to avoid the problems arising from the processing of wet, settable gypsum by first producing a raw plate of a paper-fiber suspension and finely milled raw gypsum on an endless screen belt machine. After that the plate is treated in an autoclave, whereby the dihydrate is converted into settable alpha-hemihydrate. Subsequently the plate is cooled, left to settle again in its own wetness and dried (German Patent document DE 34 19 558).

In Japan numerous wet processes for GF-plates have been developed. NIPPON HARDBOARD (German Patent document OS 28 33 550), ONODA-ASANO (German Patent document OS 2 517 558) and NIHON CEMENT (U.S. Pat. No. 3,951,735) have to be mentioned. The Japanese processes favor alpha-gypsum as binder, in order to obtain thin plates with high strength. These are all modified Hatschek or endless screen-belt processes.

If the specific problems arising in the wet processes are analyzed, it is found that by far the biggest problem is the mechanical dewatering of a gypsum-fiber suspension. The Hatschek process uses the fact that the filtration speed decreases with the square of the filter cake thickness, while the flow throughput decreases only linearly with respect to the thickness. Therefore a multitude of thin dewatered layers are layered on top of each other in order to obtain the desired plate thickness.

In the endless screen-belt process a further phenomenon occurs, namely the fact that starting from a certain filter cake thickness, the pressure drop decrease in the cake increases more than the induced suction, so that the uppermost layer of the filter cake may not be dewatered. This happens primarily with the regular plaster of paris, which in contact with water tends to decompose into fine particles, thereby offering enormous filter resistance.

SUMMARY OF THE INVENTION

The present invention overcomes the above-described problems and provides an endless screen-belt process for the production of fiber-reinforced gypsum plates with a high output. It consists of a combination of steps taken in carrying out the process, as well as concrete devices for the implementation of these steps. As already known, thereby a thin suspension of aridized beta-hemihydrate and/or alpha-hemihydrate and lignocellulose-containing reinforcement fibers and optionally additives and admixed materials is distributed over a water-permeable transport belt, the excess water being basically removed by underpressure section, whereby a filter cake is formed which optionally can be further dewatered by mechanical pressing; the cake is left to settle and is then finally thermally dried.

According to the invention:

a) a gypsum is used which has a bulk density of more than 950 g/l in the case of alpha-hemihydrate, respectively of more than 700 g/l in the case of beta-hemihydrate, whose particle size distribution has an angle of gradient of more than 40° in the RRSB grain grid and which in the case of beta-hemihydrate is not ground after calcination.

d) The reinforcement fibers are processed to a fiber material which is mechanically dewatered prior to being mixed into the gypsum suspension and is then thinned again with the water resulting from the dewatering of the gypsum-fiber suspension.

e) the vacuum filtration is supported by mechanical means.

The selection of the gypsum is of the greatest importance for the success of the process. In order for a suspension to have good filtering properties, the particle size distribution and the shape of the suspended solid substance has to fulfill certain conditions. Without getting into details of the parameters now, it can be established that they are good for the mentioned kinds of gypsum.

A type of gypsum which is ideal for meeting those conditions is an alpha-hemihydrate, which was obtained in a watery suspension from fine-grained raw gypsum. (Fine-grained means here that the gypsum can be kept in suspension by moderate mixing.) Such an alpha-hemihydrate is mostly produced with an average particle size of 30 to 80 μm. It is separated from the suspension by means of a hydrocyclone. The fine particles are returned to the process with the overrun as nuclei. In this way the finished product is a screened material with very little of the finest particles. In the RRSB grain grid such gypsums show an angle up to 80°.

An important factor for the quick and extensive dewatering is the cubic shape of the particles, i.e. the axial length proportions are low. Plate-shaped or needle-shaped crystals are not desirable. Besides determining the fineness, the particle shape influences the bulk density of the gypsum. It has been proven that a bulk density of more than 950 g/l for alpha-hemihydrates indicates a good lower threshold, and it should not fall below for the applications of the invention.

In an alpha-hemihydrate the maximum particle size should stay below 200 μm, because larger particles tend to deposit sediment in the suspension and collect at the bottom of the filter layer A further reason is that the rehydration of large alpha-hemihydrate crystals takes place very slowly. This is because the water can not penetrate the particles as is the case with the beta-hemihydrate, e.g. here time-consuming dissolution and diffusion processes take place.

A large part of the industrially produced alpha-gypsum is dry steamed in an autoclave. Thereby aggregations of needle-shaped crystals are formed, which break into more cubic particles during milling. Although the particle size distribution typical for screening is not obtained, such an alpha-hemihydrate still possesses a considerable steeper screening line than gypsum obtained from milled natural rock. Such a gypsum still corresponds to the requirements of the present process, but as a rule is too expensive for mass production.

By contrast such alpha-hemihydrates which have been produced at high temperatures and with short treatment times cannot be used. They are hardly different from the usual plaster of paris.

In many technical processes a fine-crystalline raw gypsum (dihydrate) results as a waste product. The most important of these processes are the flue gas scrubbing with limestone or burnt lime and the treatment of phosphate ore with sulfuric acid. (In certain phosphoric acid processes even alpha-hemihydrate results). Further process which produce visible gypsum can include: the neutralization of waste sulfuric acid with limestone, the treatment of iron sulfate with lime, the treatment of waste calcium chloride with sulfuric acid whereby hydrochloric acid is obtained, and the production of citric acid.

These raw gypsums too have most of the properties which are important for good filtration. Flue-gas gypsum from wet scrubbing processes using limestone as absorbers according to today's state of the art always yield a raw gypsum which fully meets the requirements of the invention. The other kinds of gypsum have to be tested case by case to see whether they can be used. Often these gypsum types are not yet industrially used and therefore there is no economic reason to improve them from the point of view of dewatering. However in principle it is possible to conduct each of the mentioned processes so that a useful raw gypsum results.

The screening lines of milled natural gypsum are always substantially flatter and reach in the RRSB-diagram angles of only approximately 40°. The screening of natural gypsum to the required values does not make sense economically, but theoretically could also lead to a useful gypsum. Raw gypsum however is not a binder and has to be calcined into hemihydrate or anhydride.

During dry calcination the configuration of the raw gypsum grain is maintained disregarding the unavoidable abrasion. Fully burnt anhydride as a rule remains stable at contact with water, up to the setting, however due to its slow setting it is less suited for the production of plaster plates. By contrast beta-hemihydrate disintegrates more or less strongly, as soon as it is mixed with water. Thereby the originally suitable granulometry is destroyed.

However the disintegration can be extensively prevented when the raw gypsum is burnt in the presence of hygroscopic salts, as a rule calcium chloride, in a cooker operated in batches or an equivalent calcination apparatus, such as the "Beau-Oven" beloved in France. The process is known as aridization.

The used amount of calcium chloride equals 500 to 5000 ppm and depends on the type of raw gypsum. With raw gypsums of the kind preferred here 1000 to 3000 ppm are necessary in order to obtain the desired stability in an aqueous medium.

In the case of flue gas gypsum it is of particular interest and advantage if in the flue-gas washing cycle there is always a considerable amount of alkaline earth (preponderantly calcium) chloride, which after the separation of the dihydrate can be found again partially in the residual adhering water. The amount can reach up to 10,000 ppm, depending on the operational state of the flue-gas scrubber and on the degree of mechanical dewatering of the raw gypsum. The customers in the gypsum industry demand <=100 ppm, which requires a considerable effort for the after washing of the raw gypsum.

This allows use of unwashed flue-gas gypsum as a raw material for the plaster of paris. From the point of view of the ability to control the chloride content, it is advisable to blend washed and unwashed raw gypsum.

It is of decisive importance not to mill the gypsum after burning, as is done for other uses, because a screening line favorable for the filtration is changed, especially because the aridization is primarily a surface effect.

Needle-shaped gypsum crystals are produced during flue gas scrubbing with calcium oxide/hydroxide as an absorber. They also occur in the case of some phosphoric acid gypsums. The dewatering of needle-shaped gypsums takes place very quickly at first, but then stops at a very high residual water content. Therefore these crystals are not so good for the process of the invention.

According to the invention hydraulic binders can be added to the burnt gypsum. This is not self-understood, since for instance in the semi-dry process the water amount in the raw plate is usually not sufficient for the correct setting of the hydraulic binder. This danger does not exist in the filtration process. So with particularly good results it is possible to admix with the gypsum high alumina cement, and blast furnace cement (HOZ), or ground blast furnace slag Portland cement. The raw plates have then to undergo a longer maturing period. In this way plates are obtained which have an improved water resistance.

The addition of 10 to 30% of high alumina cement and 30% to 50% HOZ has proven to be particularly advantageous. The addition of such hydraulic binder substances can improve the filtration characteristics of needle-shaped gypsums to an extent that they can be used.

BRIEF DESCRIPTION OF THE DRAWING

The above and other objects, features and advantages of the invention will become more readily apparent from the following description, reference being made to the accompanying drawing in which.

SPECIFIC DESCRIPTION

Figure 1:
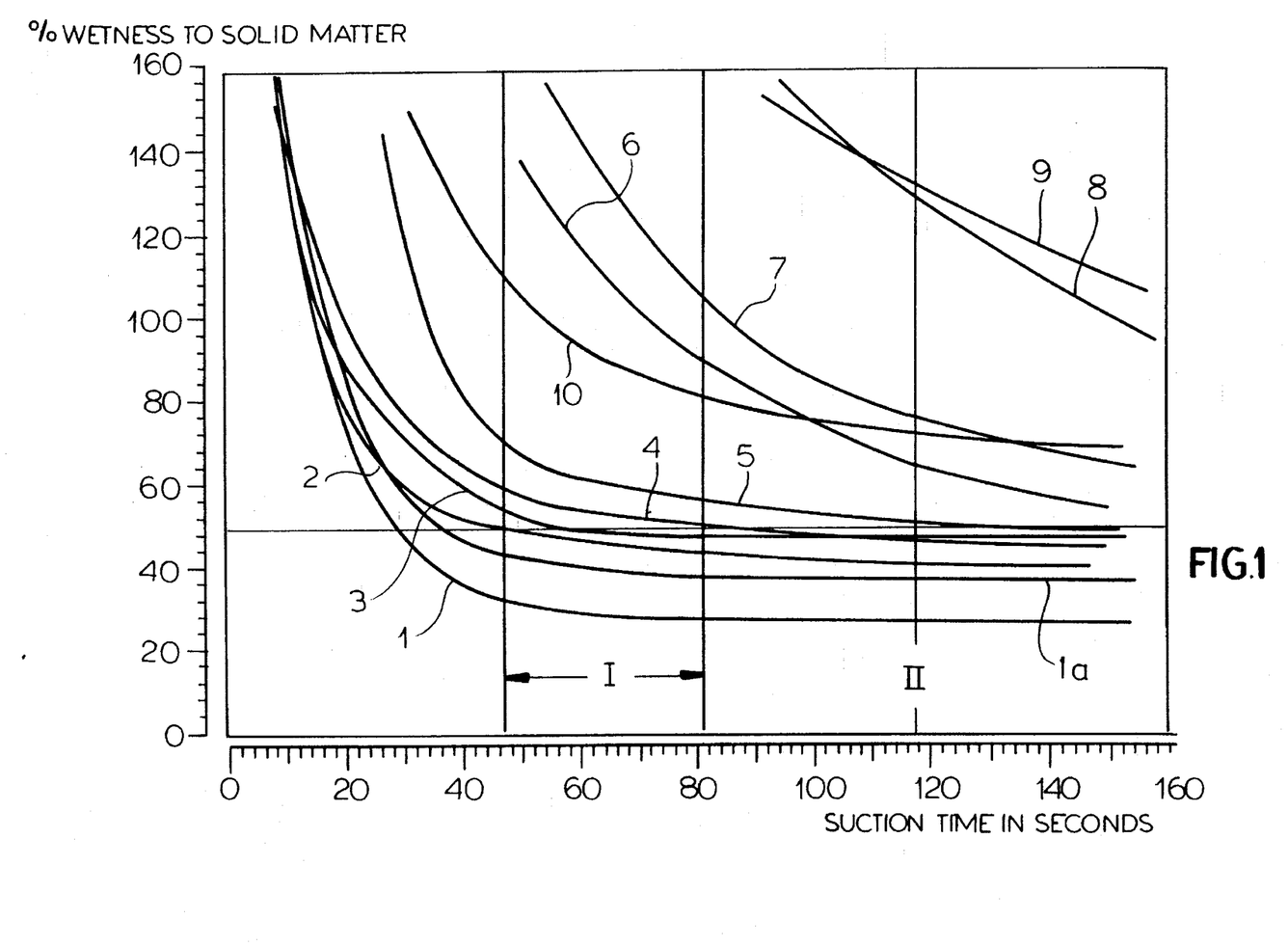
FIG. 1 is graph of dewatering behavior of gypsum-fiber suspensions in which the proportion of wetness to solid matter is platted along the ordinate against suction time plotted along the abscissa.

The diagram in FIG. 1 shows with the aid of examples the dewatering behavior of gypsum-fiber suspensions with gypsums according to the invention and other kinds of gypsum. All examples are measured on suspensions with a consistency of 20% and a content of waste paper of 9% in the solid matter. The applied suction is 350 mbar in each case.

The suspension quantity and the surface where suction is applied are constant, so that each time a filter cake layer of approximately 10 mm is formed. The curves represent the development in time of the residual wetness of the filter cake. They signify:

TABLE 1

Characterization of various gypsums for the dewatering test

| | | g/l | grade |
|---|---|---|---|
| Curve 1 | alpha-hemihydrate (Nitto process)* | 1100 | 55 |
| Curve 1a | alpha-hemihydrate (Nitto process)** | | |
| Curve 2 | flue-gas gypsum A aridized* | 950 | 60 |
| Curve 3 | flue-gas gypsum B aridized* | 850 | 55 |
| Curve 4 | flue-gas gypsum C aridized* | 800 | 48 |
| Curve 5 | flue-gas gypsum D aridized | 650 | 55 |
| Curve 6 | natural gypsum rough aridized | 1050 | 39 |
| Curve 7 | flue-gas gypsum B not aridized | 830 | 54 |
| Curve 8 | flue-gas gypsum C not aridized | 800 | 48 |
| Curve 9 | natural gypsum rough not aridized | 1070 | 38 |
| Curve 10 | natural gypsum fine not aridized | 950 | 33 |

(* = according to the invention)
(** = residual wetness corrected according to higher water absorption in the pores in beta-hemihydrate)

The numbers in the next-to-last column indicate the bulk densities. It can be seen that the flue-gas gypsum D is way out of line. It is mostly needle shaped and therefore has a bulk density of only 650 g/l. Therefore it is not suitable according to the requirements of the invention.

The numbers in the last column reflect the angle of inclination in the RRSB-diagram. It can be seen that only beta-gypsums which have an angle of inclination of more than 40° and a bulk density over 700 g/l are suitable. Furthermore, they have to be stabilized through aridization. In the case of alpha-demihydrate the bulk density has to be higher than 950 g/l.

Assuming that a residual wetness of 50% has to be reached, as indicated by the horizontal line, it can be seen that the gypsums of the invention are far better than the others. Curve 6 corresponds to a gypsum as claimed in German Patent Document DE 23 36 220. It comes the closest to a gypsum suited for a continuous screen-belt process. However it still requires twice the time (II) than the gypsums of the invention (I). At a residual wetness higher than 50% the difference is not so great. However it is desirable to work with even lower values. Thereby the difference becomes even bigger.

A good filtering ability of the gypsum-fiber suspension allows for the dewatering of relatively thick layers. The fiber and the gypsum distributed throughout the suspension also act like a filter. Therefore in this case it is not necessary to use a felt with high filtering resistance as a filtering band; a screen is sufficient. The required filter surface, the underpressure and the suction time depend on the combined filter resistance. In the end this is what determines the throughput of an installation, as well as the needed drive output for the filter belt and the vacuum pumps.

The minimum thickness of the dewatered layer should not fall below 3 mm, because otherwise the losses of solid matter with the aspired water increase strongly.

It has also been found that a content of cellulose fibers or the equivalent of waste paper fibers, of a minimum 3% of the total mass should be used, in order to minimize the suction losses and also in order to prevent a separation of the suspension.

When working with cellulose fibers alone, the preferred range is between 7% to 12%. With this fiber content the density of the finished GF-plates ranges between approximately 1.1 and 0.6 T/m$^3$ respectively. At the same time the strength goes through a maximum within this range. This applies to the case when the dewatered layer is not subsequently densified by a press. In subsequently densified plates the strength maximum moves to higher fiber contents, whereby the absolute value of the strength increases considerably. While under favorable conditions the unpressed plate with a fiber content of about 10% can reach 10 N/mm$^2$, the pressed plate can reach 20 N/mm$^2$ at a fiber content of about 15%.

If cellulose fibers are replaced by short mineral fibers such as rock wool, it is most advantageous to replace them in a proportion of 1.5 to 3 times the weight, in order to maintain approximately the same content per volume. In long and cut fibers, such as glass fiber rovings or synthetic high-module fibers, such as polyvinyl acetate, polycarbonate or acrylonitrile fibers the proportion can be lower than the proportion of the replaced cellulose fibers.

In addition to the fiber content, the fineness of the fiber preparation is also an important parameter. The fineness of paper materials is normally measured in Shopper-Riegler degrees. It has been found that a range between 38° to 52° SR is particularly advantageous for the process of the invention.

The dewatering of the layer takes place in at least two zones with different underpressures. The more subdivisions are created, the more the suction distribution can be optimized for various criteria (minimum energy use of the pumps, shortest possible dewatering zones, smallest possible screen tension). In practice however the natural variation range of raw material properties is so great, that subdividing in more than three zones does not seem to make sense.

It is generally valid that the dewatering should begin with minimal underpressure, i.e. up to 65 mbar, be continued with medium underpressure, i.e. up to 150 mbar and be concluded with high underpressure, i.e. up to 550 mbar.

When there is a suspension which can be well dewatered, the individual zones are each approximately of the same length. In the case of suspensions which are not filtering well, the low-suction zone should be at least as long as the two remaining ones together. When one operates only with two dewatering zones, the intermediate stage is eliminated. The dewatering has to take place in the first zone until the surface of the layer has become mat. At a given length of the dewatering zone it is necessary to adjust in some cases the speed of the screen and/or the underpressure to this limitation.

The residual wetness and therewith finally the density of the finished plate is determined by various parameters, from which some are set by the properties of the used materials. If these are regarded as constant, then the most important influencing values are the thickness of the dewatered layer, the consistency of the suspension and the content of cellulosic fibers in the suspension. The thickness of the layer, as well as the consistency determine primarily the suction time, i.e. the maximal speed of the screen. The limit wetness which establishes itself at the given suction and dewatering time and is on the contrary determined primarily by the content of cellulose fibers. The degree of applied suction as well as the suction time are here of secondary importance.

If one wants to eliminate this dependence, there remains as a way out the subsequent compression by squeezing out water. This does not contradict the process of the invention, but is not desirable because the required presses are expensive and complicated. A more favorable possibility to influence the densification of the gypsum-fiber layer consists in assisting the dewatering in the last stage, which determines the final state, by vibration and/or shearing forces.

One or more stripping rods oscillating transversely to the travel direction of the screen have proven to be particularly effective. The amplitude should be in the range of 1 to 5 cm, the frequency 5 to 20 Hz and the line contact pressure 3 to 20 N/cm. With such densification assistance the limit wetness can be lowered by up to 10%. A further advantage is that the surface is levelled.

It is economically very important for the practical implementation of the process to follow as close as possible the ideal thickness of the plate. When there are portions of lesser thickness the screen structure cannot be ground; when the thickness is exceeded, the losses due to grinding are high.

The thickness of the dewatered layer is therefore the control value for the amount of material supplied per time unit. For this reason it is necessary to measure the layer thickness as early as possible. This can be done through a contact less profile measurement. Its evaluation also permits an adjustment of the device for the distribution of the suspension across the screen width.

Plaster of paris is three or four times more soluble in water than dihydrate. With the large amounts of water which are used in the process, this fact can create a few problems. When for instance the water obtained from the dewatering of the gypsum-fiber suspension is returned to the paper treatment, then up to 2% of the plaster of paris used in the paper suspension as a dihydride can be lost. This is not only a loss of binder, but can also destabilize the process, because dihydride has a strong accelerating action on the setting of the gypsum. It is therefore an essential feature of the invention to keep the water cycles of the paper preparation and of the plate formation separated as much as possible.

The plate-forming system is in equilibrium only when as much water is carried in by the paper fiber as can be carried out through the plate and evaporated during the process.

At a fiber content of 10% and a residual wetness of the dewatered layer of 50% the consistency of the introduced fiber material has to amount to 15%. Such a material cannot be pumped and precisely enough dosed. Therefore according to the invention the dosage of the fiber material is performed in a suspension with low consistency. When the consistency is kept constant or is continuously measured, as is normally done in the paper industry, the material can be volumetrically dosed.

The material is then continuously dewatered to the required minimum consistency or higher; afterwards it is again continuously diluted with the water from the plate-forming cycle to a lower consistency and fed into the mixer for the gypsum-fiber material. The redilution assists the mixing of the water with the gypsum. Suitably a consistency of 3% to 7%, preferably of 4% to 5% is set.

The water cycle in the plate-forming system results from returning the water which is removed from the gypsum-fiber suspension to the mixture. During dewatering approximately 1% to 3% of the solid matter is entrained. In order to avoid that the gypsum deposits in intercalated buffer containers, it is removed in a sedimentation funnel and returned to the mixer over a short path. The separation of the solid matter is assisted by the addition of polymeric flocculation agents known per se.

It is known that flocculation agents also assist the dewatering of suspensions. The flocculation agent introduced in the mixer together with the return flow of solid matter helps also in the dewatering of the gypsum-fiber suspension on the screen. However part of the action is again destroyed by the shearing forces generated during mixing. This effect is not undesired since, when the flocculating action is too strong, the uniform distribution of the suspension across the screen is made more difficult due to premature sedimentation. Through controlled addition of flocculating agents the effect on the process can be controlled. Under certain circumstances a very strong flocculating effect could be desirable, e.g. then when the process is run with a low content of cellulose and a high content of mineral fiber.

It is inherent to the water and material cycle of the plate-forming system that the setting times of the gypsum can get out of control, because of the self-accelerating generation of nuclei. It is therefore necessary and customary to stabilize the system by admixing additives therewith. Particularly effective is a relatively high-dosage combination of delaying and accelerating substances known per se.

The quality of the plate created through dewatering is determined to a large extent by the consistency of the gypsum-fiber suspension. This has to be set so that a free flow of the material is insured. When the consistency is too low, the dewatering times and the losses of binder increase. When the consistency is to high, the fibers can interlock. This hinders the orientation of the fiber in the plate plane and leads to net-like zones of lower fiber content and thereby weakens the plate. Therefore it is necessary to select a water content of the suspension which is as low as possible, but still insures flowability.

The flowability is primarily a function of the fiber content. The binder content plays a secondary part. As a control value a content of approximately 3% cellulose fiber with reference to the water amount can be assumed by the suspension, a value which should not be surpassed. In practice the optimal value can slightly deviate from this value.

As soon as the plate is formed, it is trimmed at the lateral edges. The border strips are mixed as soon as possible with the recycled water and again directed to the mixer. The proportion of the border strips in the mixer is quite considerable. Each passage of the water and the borderstrip materials through the cycle increases quite considerably the proportion of the finest particles, which hinder the filtration. Here too is a source of instability, like in the case of the nuclei accelerating the setting.

Unfortunately in this case there is no safe and efficient means of facing this, except for throwing away the border strips. This is not reasonable from an economic point of view. Therefore this proportion has to be kept as low as possible and the preparation has to be performed as gently as possible. A way to diminish the proportion is the selection of a large work width. Also special care has to be taken to keep the unavoidable border strip effect to a minimum in the transverse mass distribution.

Before the setting starts in, the continuous web of GF-plates has to be subdivided and separated, because the plate expands during setting up to 5 mm/m. In a plate that has not yet been separated, this would lead to warping.

The separation into individual plates offers the possibility to select the way in which the plates would be temporarily stored prior to drying. In quickly setting gypsum a correspondingly narrow transport belt is suitable. When hydraulic binders are used, stacking between sheet metal plates or other plates is known.

Figure 2:
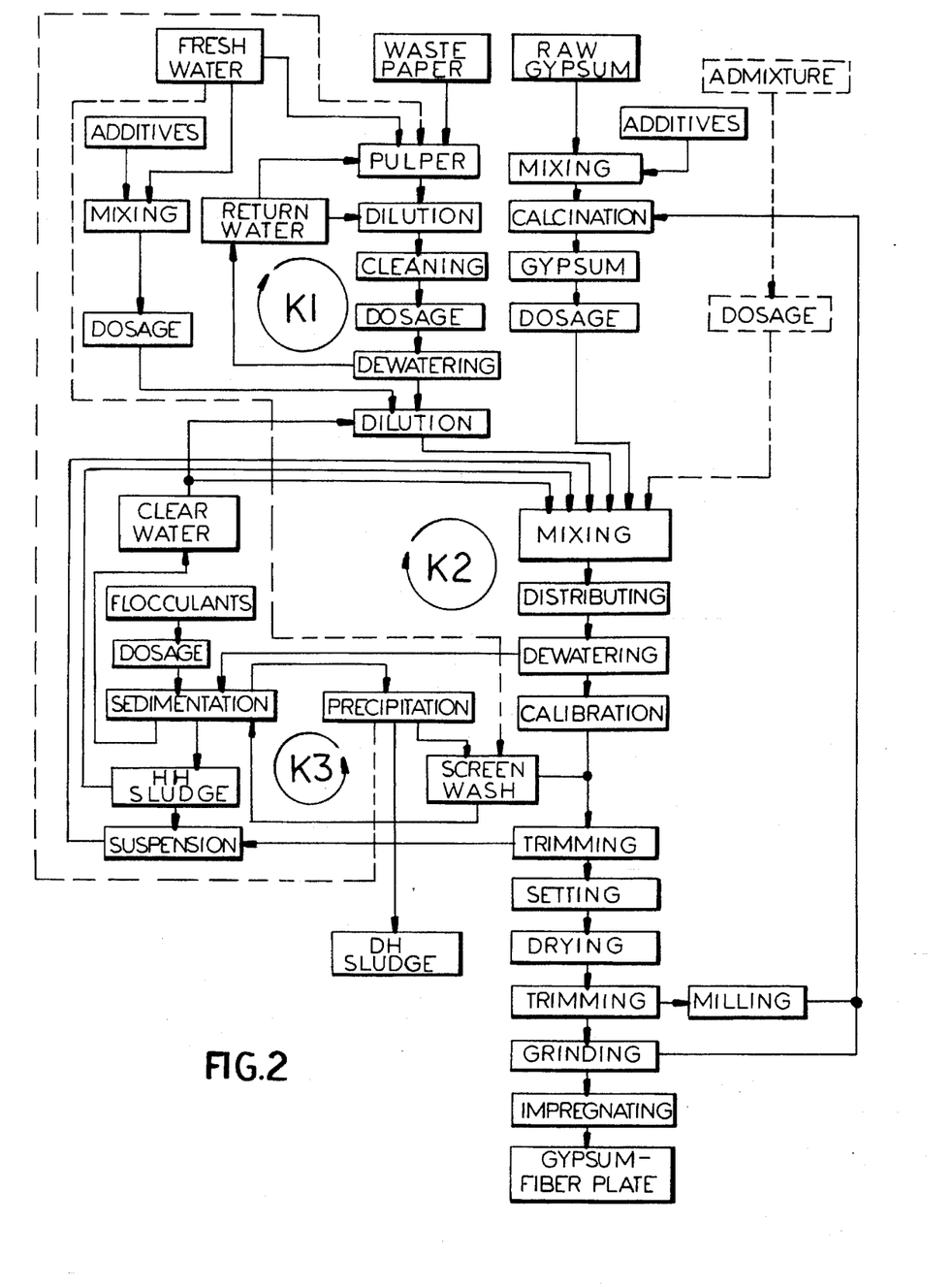
FIG. 2 is a block diagram illustrating steps in the process.

FIG. 2 is a flow sheet of the process of the invention. The circles with arrows K1 and K2 indicate the separate water cycles. K3 indicates a third water cycle which has not been referred to previously and which is coupled with the second cycle. It is the washwater cycle for the screens and belts participating in the dewatering.

Here a complication can occur when fresh water has to be introduced in the cycle. In the preliminary dewatering of the fiber material it is technically not possible to fall below the amount of water which is carried out with the plate (during drying), in order to create this way more latitude for the introduction of fresh water in the GF-cycle (K2). This can only succeed when the process is run with a very low cellulose content. As a rule the water management is just balanced. In this case the water amount introduced during washing has to be evacuated from the GF-cycle and treated again so that it can be returned to the wash cycle or it can be fed with the fresh water in the paper cycle (K1).

The total water amount of the GF-cycle (K2) runs then through the sedimentation stage, thereby already removing the suspended solid matter. In the treatment of the residual water then only the dissolved gypsum has to be taken care of. The supersaturation of the water with dihydrate, which is approximately triple, is suitably reduced to 1.5 up to 2 times in a sufficiently large intermediate buffer tank wherein the dihydrate can precipitate. When after that it is also diluted with fresh water, dihydrate can no longer precipitate.

In FIG. 2 the dust from grinding is introduced in the calcinator and again transformed into settable material. In practice this can create a problem, because the dust from grinding is very fine and can impair the filtering properties of the gypsum. For each case the amount of dust from grinding which can be returned to the gypsum must be tested. In some cases it might prove necessary to waste a part of the grinding dust or to redirect it to another production line, e.g. for finishing plaster.

The process flow can be explained with the aid of a few examples. The process steps which need no further explanation, will thereby not be described separately. In Table 2 the relevant parameters are listed.

The gypsum is an aridized flue-gas gypsum, originating from a flue-gas scrubber of a power plant running on mineral coal, wherein limestone was the absorbent.

The used fiber is waste paper subjected to wet treatment and having a proportion of 15% of sulfate paper.

The necessary types and amounts of used additives, which can be easily established by any person skilled in the art and are different for each type of gypsum, are not indicated.

The amounts to be used refer to the unground plate. During grinding, approximately 0.5 mm are ground off.

The three suction zones are each 4 m long.

In all cases the subsequent densification with a press has been eliminated.

The Examples 1 to 3 vary the fiber content, Example 4 shows the effect of greater thickness. Example 5 is a comparative example with aridized plaster of paris on a natural basis, according to German Patent document DE 23 36 220. A dramatic effect can be noticed at the plant output and on the bending resistance. When common gypsum is used the plant output falls practically to zero.

TABLE 2

| | | Examples | | | | |
|---|---|---|---|---|---|---|
| | | Exmp 1 | Exmp 2 | Exmp 3 | Exmp 4 | Exmp 5 |
| I Setting values | | | | | | |
| Belt speed | m/min | 9.2 | 7.3 | 6.1 | 4.8 | 2.0 |
| corresponds to capacity | microns/h | 1400 | 1100 | 900 | 700 | 300 |
| fiber cons. after dilution | % | 5.0 | 5.0 | 5.0 | 5.0 | 5.0 |
| water in fiber after dilution | kg/min | 267 | 252 | 234 | 160 | 75 |
| fiber proportion in GF raw mix | % | 8.0 | 10.0 | 12.0 | 10.0 | 10.0 |
| gypsum proportion in GF raw mix | % | 92.0 | 90.0 | 88.0 | 90.0 | 90.0 |
| suspension consistency | % | 25.0 | 25.0 | 25.0 | 25.0 | 25.0 |
| fiber amount in suspension | kg/min | 14.0 | 13.3 | 12.3 | 8.4 | 4.0 |
| gypsum in suspension | kg/min | 161 | 119 | 90 | 76 | 36 |
| water in suspension | kg/min | 702 | 531 | 411 | 338 | 159 |
| water in suspension | kg/min | 597 | 438 | 329 | 287 | 133 |
| therefrom in fiber | kg/min | 177 | 167 | 155 | 106 | 50 |
| therefrom for border strips | kg/min | 20 | 15 | 11 | 12 | 4 |
| therefrom in mixer | kg/min | 400 | 256 | 163 | 169 | 79 |
| II Plate Characteristics | | | | | | |
| Total thickness | mm | 10.5 | 10.5 | 10.5 | 13.0 | 10.5 |
| Total density | kg/m³ | 870 | 820 | 760 | 800 | 920 |
| Fiber prop. in finished plate | % | 7.0 | 8.8 | 10.6 | 8.8 | 8.8 |
| water to be dried | % | 39.6 | 48.5 | 57.5 | 41.0 | 44.3 |
| bending resistance of plates | N/mm² | 6.0 | 7.5 | 5.7 | 7.3 | 6.0 |

It can be seen that the density of the plates is very low. They lie throughout within the range of GK-plates. GF-plates which have been produced according to a dry or semi-dry process have densities of 1100 to 1200 kg/m³ without perlite and 860 to 1000 kg/m³ with perlite. Thereby the use of fiber per weight unit is clearly higher. Due to the fact that no perlite has to be used in order to obtain acceptable densities and to the smaller quantities of fiber and gypsum used, the production costs per volume are considerably reduced.

An apparatus for carrying out the process consists basically of:

a a unit known per se for the production of a gypsum according to the invention;

b a unit known per se for the production of a fiber suspension from waste paper;

c means for a volumetric dosage of the fiber material;

d downstream thereof a device for mechanically dewatering the fiber suspension;

e a device for rediluting the dewatered fiber suspension;

f a continuous dosage device for the gypsum;

h a continuous mixing device for fiber suspension, water and gypsum and optionally admixed substances and additives;

i a distribution device for the gypsum-fiber suspension;

j a dewatering screen belt with at least two dewatering suction devices arranged underneath the screen, which are operated with different underpressure;

k a device assisting the densification arranged over the last dewatering suction device;

l alternative to k: a downstream arranged continuous press;

m a unit known per se for trimming, cutting, setting, drying, grinding, optionally impregnating, stacking and packaging of the plates.

Figure 3:
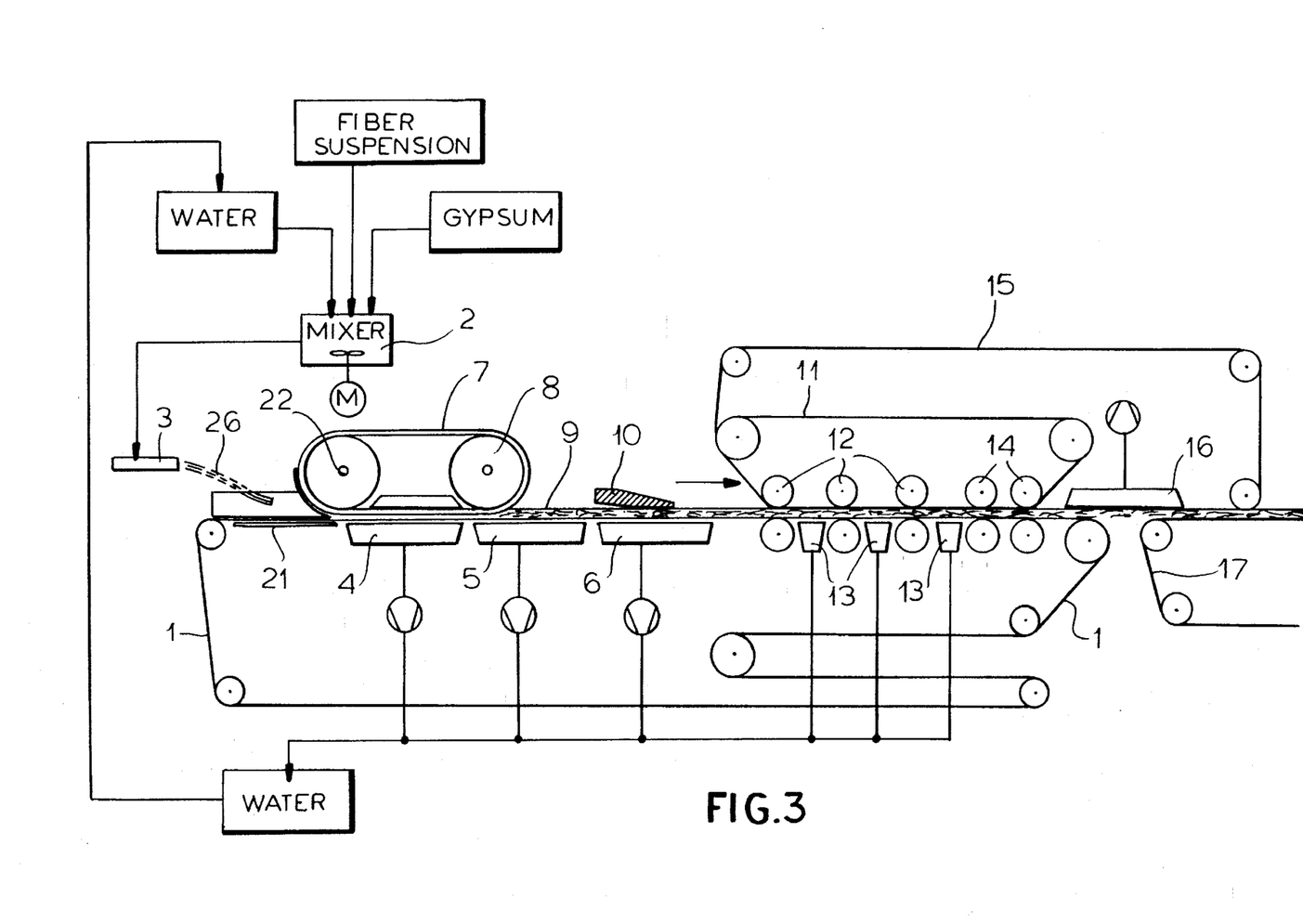
FIG. 3 is a diagrammatic side view of an apparatus for carrying out the process of the invention.

FIG. 3 shows a typical embodiment of the dewatering and molding equipment, which form the core of the installation according to the invention. These are the parts of the installation mentioned above under g to l. The rest is shown only as a block diagram or not at all. It is assumed that the respective installation parts are state of the art.

The gypsum-fiber suspension from the mixer 2 is loaded on the screen belt 1 via the distribution device 3. It is dewatered on the dewatering suction devices 4, 5 and 6 in three stages with increased pressure. After leaving the distribution station, the still flowable suspension is kept on the web by means of flexible delimiting bands 7, which run around two guide wheels 8 with large diameter.

Via the suction device 6 which is particularly rigid, an oscillating stripping bar 10 presses on the gypsum-fiber layer 9. This bar assists the dewatering and offers a limited possibility to influence the degree of residual wetness in the filter cake. After that the GF-web runs to a press 11. As indicated at 12 and 13, this press 11 can operate so that water continues to be expelled, but it can also only smoothen, as indicated by 14. Optionally the press can also be completely eliminated, so that only the screen belt 15 remains, which serves for the transfer of the GF-layer from the dewatering screen to a further transport belt 17. The transfer is made possible by a suction box 16 extending close over the screen.

For the devices 3 for the transverse distribution of the suspension various constructions are known, which have proven themselves in asbestos-cement technology (revolving screen drum, silting boxes). However for cases using gypsum it is advisable to use a special distribution device, which insures that no material dwells for a longer time in dead zones.

Figure 4:
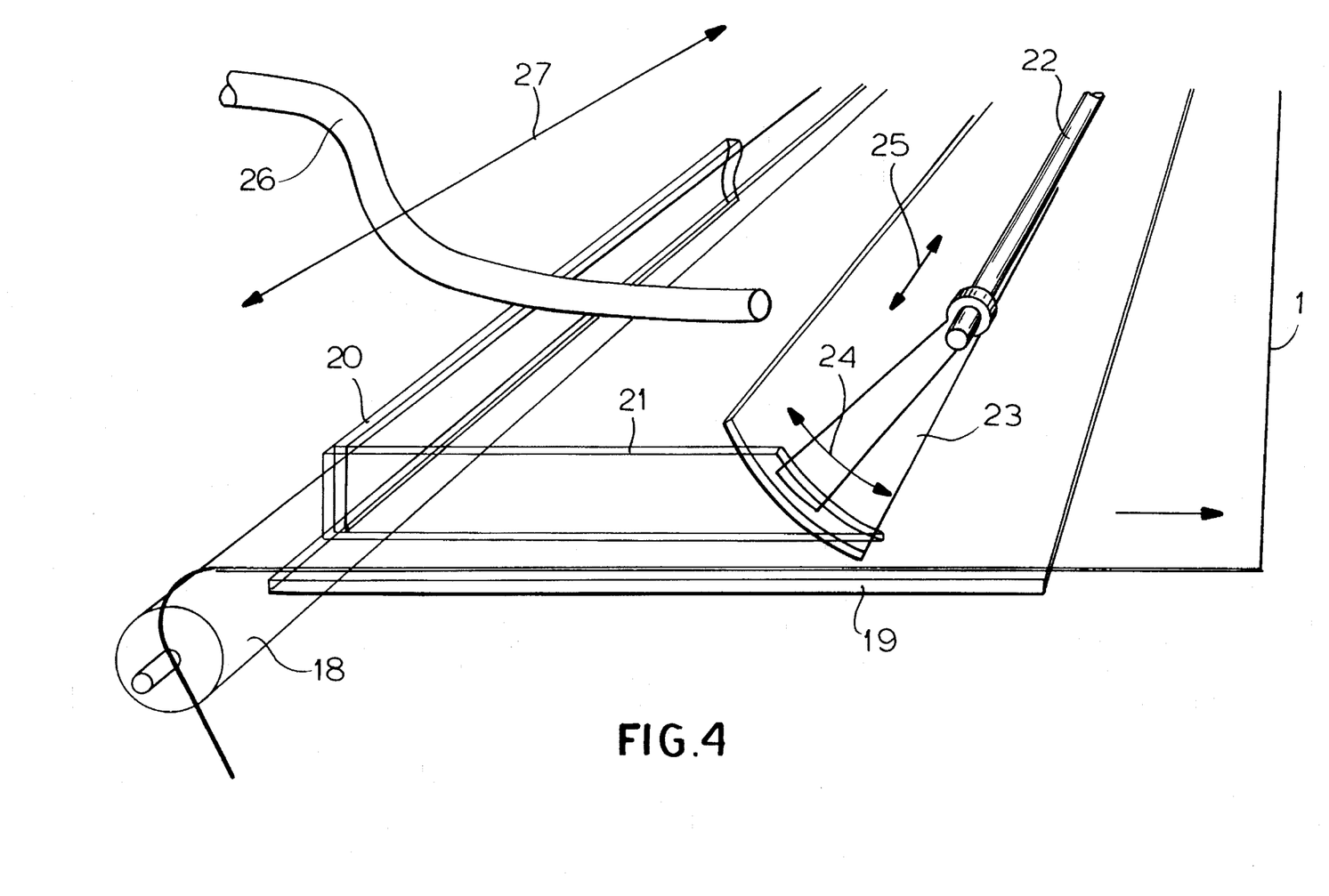
FIG. 4 is a perspective view of a portion of an apparatus for use in the invention.

Such a device is shown schematically in a perspective view in FIG. 4. Behind the guide roller 18 under the screen 1 a flat and precisely horizontal plate 19 is mounted. It serves first of all as an accurate reference surface for the onflowing suspension, and in second place prevents a premature and uncontrolled dewatering.

Above the screen there is a box with a rear wall 20 and lateral walls 21 which end in an arc of circle. The arc of circle has a radius which is predetermined by the distance to an axis 22. A bent sheet metal plate 23 is supported so that it is rotatable about this axis and fits the cutout of the lateral walls. By rotation 24 about the axis 22, the outflow gap between the screen and the sheet metal plate can be adjusted. The sheet metal plate can also oscillate in the horizontal direction 25. This assists the even distribution of the suspension.

The suspension is supplied through a hose 26, which is moved back and forth in horizontal direction 27 over the entire width of the loading box. As a first approach this motion is linear, but it can also be adjusted speedwise in order to level a possible irregular mass profile.

Figure 5:
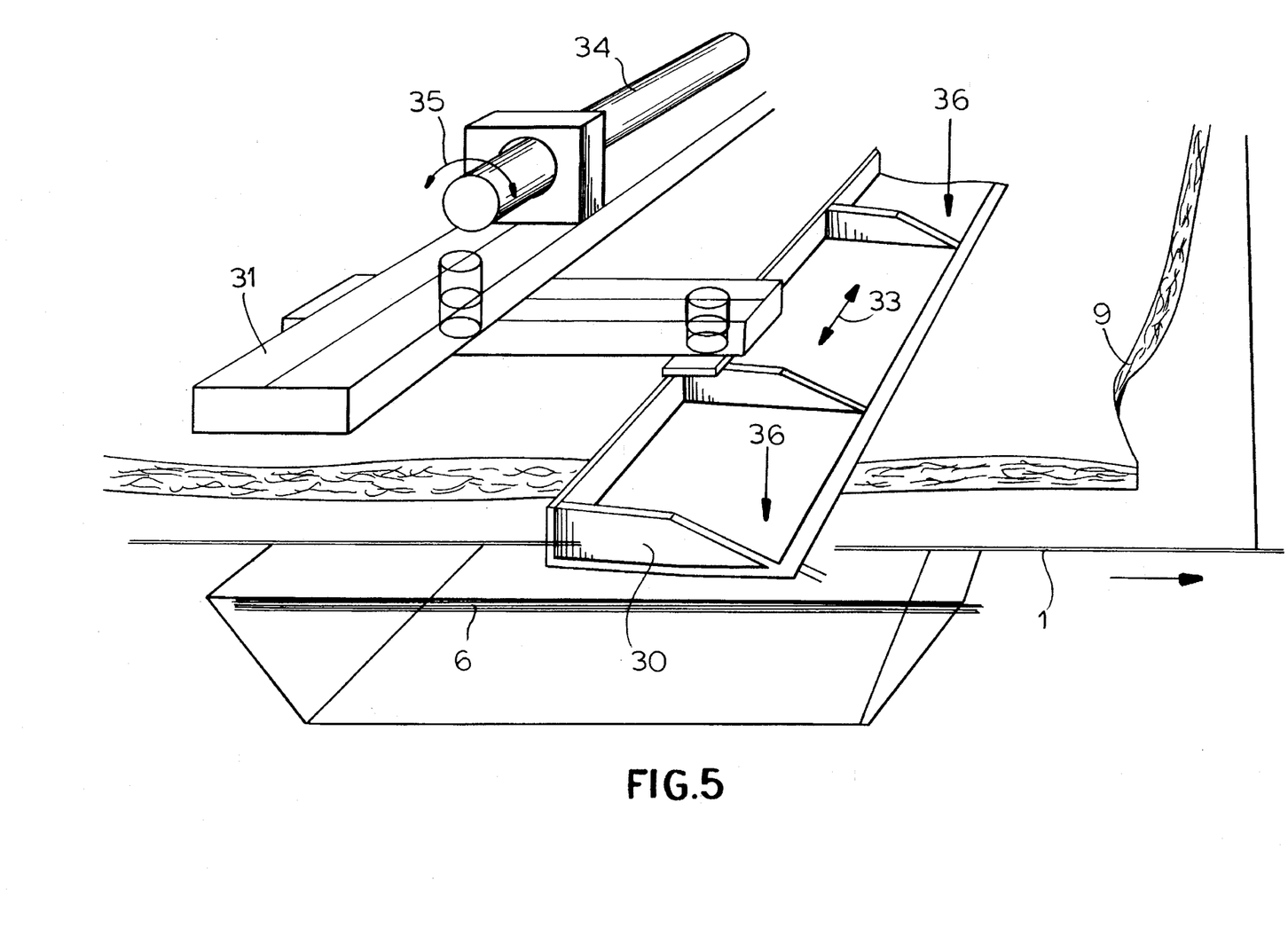
FIG. 5 is a perspective view of another portion of an apparatus for use with the invention.

FIG. 5 shows in detail the construction and the modus operandi of a possible mechanical device for the assistance of the dewatering process in the form of an oscillating bar. Over the stiffened dewatering suction device 6 runs the screen 1 and the GF-web. Above that is a rigid bar, which is fastened to a crossbeam 31 by means of vertical pivots 32 in a parallelogrammatic mounting. Thereby the bar can be moved back and forth in the direction 33 by a drive not shown in the drawing. The crossbeam is swingable about an axis 34, so that the position of the bar can be adjusted to the thickness of the plate. The bar can also serve for measuring the plate thickness, by measuring its height position.

When the bar is supposed to exert a pressure which exceeds its own weight, it has to be acted on by a force 36. For the constructive execution of such a force actuation there are several ways, however the own weight should be used as much as possible.

Figure 6:
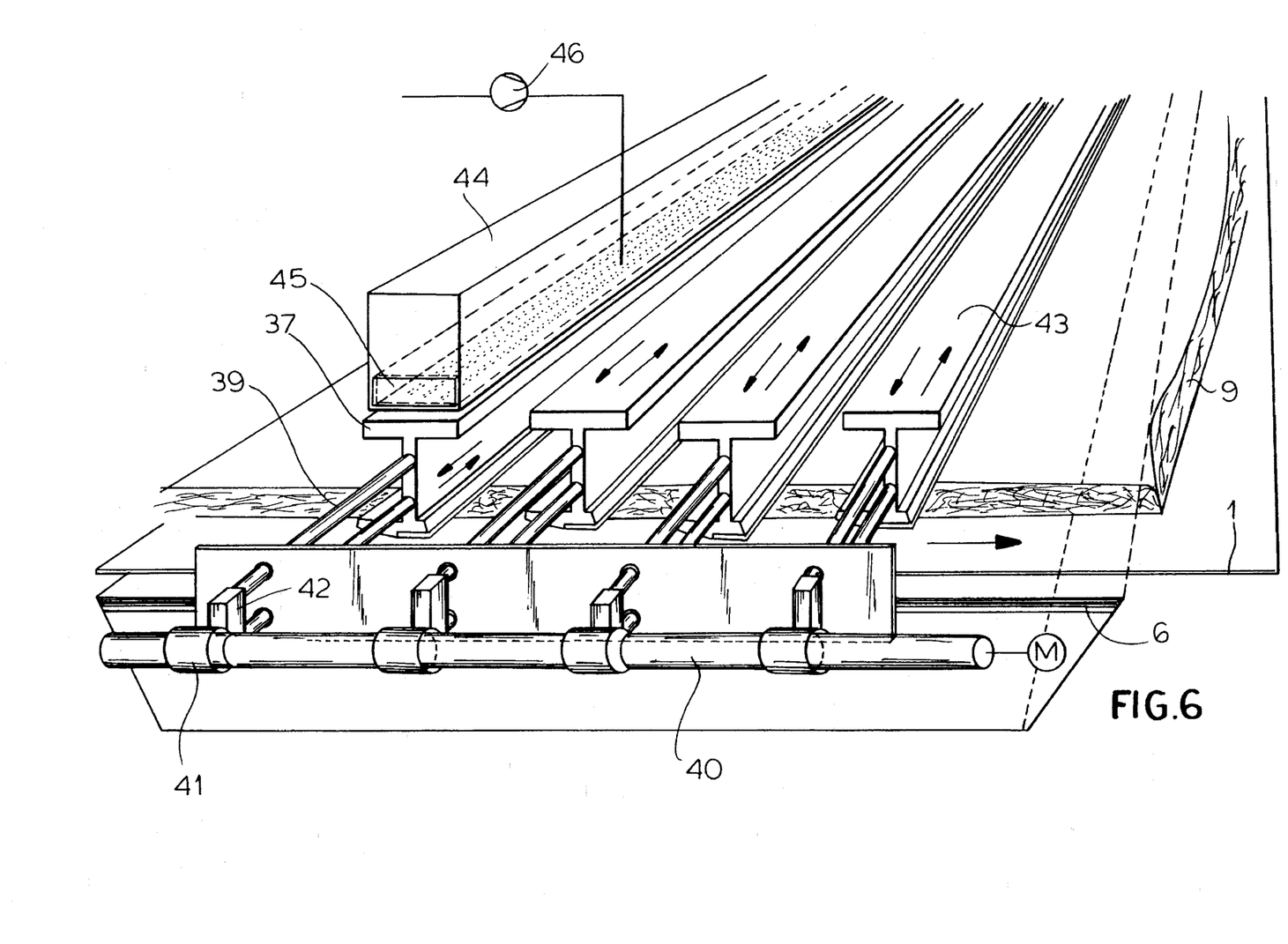
FIG. 6 is a perspective view of another portion of an apparatus for use with the invention.

Another embodiment of the device assisting the dewatering process is shown in FIG. 6. It uses several bars 37 operating in opposite directions, which are reinforced at their working edge with ceramic plates 38. They are driven by two bilaterally engaging shafts 40 running in the same sense with cams 41 (here only one shaft is shown). A crank shaft is also a possibility. The individual bars are pressed onto the layer with an adjustable force. Thereby they rest against a heavy crossbeam 44 arranged above them, which establishes a maximal force due to its own weight and which is supported in guides (here not shown) so that it can optionally be deviated upwards They thus glide on an air cushion 45 created by compressed air 46 or are suspended on a magnetic field which generates repulsion forces. In a special embodiment of the installation magnetic cushions and a linear motor as a drive are integrated on a rail.

I claim:

1. A process for continuous production of gypsum-fiber plates, comprising the steps of:

(a) providing a gypsum product which has a particle size distribution with an angle of inclination greater than 40° in the RRSB grain grid and is selected from the group consisting of:

an alpha-hemihydrate gypsum having a bulk density greater than 950 g/l, an aridized beta-hemihydrate gypsum unground after calcination and having a bulk density greater than 700 g/l, and mixtures thereof;

(b) processing cellulose-containing reinforcement fibers in the presence of water into a fiber material, mechanically dewatering said fiber material, and rediluting the mechanically dewatered fiber material with water recovered from a dewatering of a gypsum-fiber suspension, thereby forming a fiber product;

(c) forming a thin aqueous suspension of said gypsum product and said fiber product;

(d) distributing said suspension over a water-permeable transport belt;

(e) removing excess water from said suspension on said water-permeable transport belt by suction assisted by mechanical means to form a filter-cake layer on said belt in a single layer filtration, thereby recovering from said suspension on said belt water which is recycled to step (b) for rediluting the mechanically dewatered fiber material;

(f) permitting said filter-cake layer to settle on said belt; and (g) thereafter thermally drying said filter-cake layer to produce a gypsum fiber plate.

2. The process defined in claim 1 wherein said alpha-hemihydrate is produced in a watery suspension of fine-grained raw gypsum.

3. The process defined in claim 2 wherein said alpha-hemihydrate has a maximum particle size of 200 μm.

4. The process defined in claim 1 wherein said beta-hemihydrate is produced from a raw gypsum which results as a waste product in industrial-scale chemical reactions, through batchwise calcination in a cooker or in a burning unit in the presence of salts which have an aridizing effect.

5. The process defined in claim 4 wherein for the production of the beta-hemihydrate a dihydrate is used which originates from flue-gas desulfurization by a wet absorption process with limestone as an absorbent and which has been washed to an alkaline earth metal chloride content of 500 to 5000, or alkaline earth metal chloride content by mixing washed and unwashed dihydrate.

6. The process defined in claim 4 wherein hydraulic binders are added to the gypsum product.

7. The process defined in claim 6 wherein 10% to 30 % of high alumina cement, as said hydraulic binders, is added to the gypsum product.

8. The process defined in claim 6 wherein 30% to 50 % of blast furnace cement, as said hydraulic binders, is added to the gypsum product.

9. The process defined in claim 1 wherein the proportion of cellulose-containing fibers in the solid matter of the suspension is set at 3% to 15% of the weight of gypsum.

10. The process defined in claim 9 wherein the Shopper-Riegler fineness of the cellulose-containing fibers in the suspension ranges between 38° and 52° SR.

11. The process defined in claim 10 wherein the cellulose-containing fibers are obtained from waste paper.

12. The process defined in claim 11 wherein the fiber material is set at a certain predetermined consistency during preparation, continuously volumetrically dosed in a dewatering device, from there transported without interruption to a continuously running dilution device and without any intermediate storage directly mixed with gypsum and water.

13. The process defined in claim 12 wherein the fiber material is predewatered after preparation to a consistency of more than 8% and water extracted during the preliminary dewatering process is recycled to fiber preparation in step (b).

14. The process defined in claim 12 wherein the redilution of the fiber material is performed with water from the dewatering of the gypsum-fiber suspension to a consistency of 3% to 7%.

15. The process defined in claim 9 wherein the total water amount in the mixture of gypsum, fiber and water is controlled so that a fiber content in the suspension of 2% to 5% with reference to the water content is reached.

16. The process defined in claim 9 wherein the water removed during the dewatering of the gypsum-fiber layer is treated with flocculating agents and freed by sedimentation from suspended solid matter, and is continuously returned without interruption to step (c) to the gypsum-fiber suspension.

17. The process defined in claim 16 wherein the amount of flocculating agent is so apportioned that it is active in the gypsum-fiber suspension.

18. The process defined in claim 9 wherein the water resulting from a screen washing is freed of solid matter by means of flocculation and sedimentation to produce clarified water, and the clarified water is kept in intermediate storage until supersaturation with respect to dihydrate has settled to less than 0.5, after which it is again freed of solid matter and returned to the washing or to step (b).

19. The process defined in claim 9 wherein the dewatering of the layer takes place in at least two stages with different underpressures.

20. The process defined in claim 19 wherein the first stage of dewatering of the layer takes place in three zones with different underpressures, whereby the underpressure of a first of said zones ranges between 15 and 65 mbar, in a second of said zones between 65 and 200 mbar and in a third of said zones from 200 to 550 mbar.

21. The process defined in claim 19 wherein the dewatering in a last of said stages is assisted by vibration.

22. The process defined in claim 19 wherein in a last of said stages the dewatering is assisted by shearing forces.

23. The process defined in claim 22 wherein the shearing forces are generated by one or more stripping bars oscillating transversely to a travel direction of the belt, with an amplitude of 1 to 5 cm, a frequency of 5 to 20 Hz and a contact line pressure ranging between 2 and 20 N/cm.

24. The process defined in claim 9 wherein the amount of suspension on said water-permeable transport belt is controlled so that a predetermined thickness of the dewatered layer results.

25. The process defined in claim 24 wherein the thickness of the dewatered layer ranges between 3 mm and 20 mm.

26. An apparatus for continuous production of gypsum-fiber plates, comprising:

a continuous mixing device constructed such as to form a thin gypsum-water suspension;

a source of gypsum and means operatively connected to said mixing device for continuously metering gypsum into said mixing device;

means for producing an aqueous fiber suspension and a dosage device in flow connection with said means for producing an aqueous suspension and said mixing device for continuously metering fiber suspension into said mixing device;

a device for mechanically dewatering said suspension connected between said dosage device and said mixing device to produce a dewatered suspension;

means connected between said device for mechanically dewatering said suspension and said mixing device for redilution of said dewatered suspension with water recovered from a gypsum-fiber suspension prior to feeding a rediluted fiber suspension to said mixing device;

means connected with said mixing device for metering water thereto;

a dewatering screen belt provided with means connected to said mixing device for spreading said thin gypsum-water suspension onto said screen belt;

at least two suction devices disposed in succession below said screen belt for applying different suction pressures to said screen belt thereby dewatering said suspension to form a filter-cake layer on said belt, a last of said at least two suction devices being rigid; and a densification device above said belt over at least said last suction device for densifying said filter-cake layer, said densification device comprising at least one horizontal bar swingable in contact with said filter-cake layer and transverse to a travel direction of said belt.

27. The apparatus defined in claim 26 wherein the densification device has a plate-shaped bar which rests against the filter-cake layer in a flat, adjustable angle due to its own weight and which is tiltable about a horizontal axis so that it automatically adjusts to thickness variations of the filter-cake layer.

28. The apparatus defined in claim 26 wherein the densification-assisting device has several oscillating bars working in opposite directions.

29. The apparatus defined in claim 28 wherein the oscillating bars are supported by air cushions.

30. The apparatus defined in claim 28 wherein the oscillating bars are supported by magnetic fields.

31. The apparatus defined in claim 28 wherein the oscillating bars are connected to linear motors.

32. The apparatus defined in claim 26 wherein the belt is provided with a distribution device for spreading the gypsum-fiber suspension, said distribution device having a hose swingable over the width of the belt, a horizontal plate located under the belt, and a sheet metal plate designed as a lip and adjustable by a rotatable shaft which leaves a clearance above the belt.

33. The apparatus defined in claim 32 wherein the sheet metal plate of the distribution device is in addition arranged so that it can swing horizontally, transverse to the travel direction.

* * * * *